United States Patent
Xuan et al.

(10) Patent No.: US 10,915,410 B2
(45) Date of Patent: Feb. 9, 2021

(54) DISTRIBUTED SYSTEM MANAGEMENT USING SNAPSHOTS AND PACKETS

(71) Applicant: International Business Machines Corporation, Armonk, NY (US)

(72) Inventors: Jiang Xuan, Markham (CA); Xin Peng Liu, Beijing (CN); Peng Hui Jiang, Beijing (CN); Hongmei Zhao, Markham (CA)

(73) Assignee: International Business Machines Corporation, Armonk, NY (US)

( * ) Notice: Subject to any disclaimer, the term of this patent is extended or adjusted under 35 U.S.C. 154(b) by 195 days.

(21) Appl. No.: 16/144,179

(22) Filed: Sep. 27, 2018

(65) Prior Publication Data

US 2020/0104215 A1    Apr. 2, 2020

(51) Int. Cl.
*G06F 11/14*    (2006.01)
*G06F 9/54*    (2006.01)
(Continued)

(52) U.S. Cl.
CPC .......... *G06F 11/1464* (2013.01); *G06F 9/546* (2013.01); *G06F 16/182* (2019.01); *H04L 67/10* (2013.01); *G06F 2201/84* (2013.01)

(58) Field of Classification Search
CPC ............. G06F 11/1464; G06F 11/1446; G06F 16/182; G06F 9/546; G06F 2201/84; H04L 67/10

See application file for complete search history.

(56) References Cited

U.S. PATENT DOCUMENTS 7,551,557 B2 * 6/2009 Clark .................... H04L 12/43
                                                         370/230
8,656,126 B2   2/2014 Fukui
(Continued)

FOREIGN PATENT DOCUMENTS

CN          102591744 A       7/2012

OTHER PUBLICATIONS

"System which allows a running virtual machine to have access to it's own previously stored states", An IP.com Prior Art Database Technical Disclosure, Disclosed Anonymously, IP.com No. IPCOM000237463D, IP.com Electronic Publication Date: Jun. 18, 2014, 4 pages.

(Continued)

*Primary Examiner* — Kamini B Patel
(74) *Attorney, Agent, or Firm* — Grant M. McNeilly

(57) ABSTRACT

Embodiments of the present disclosure relate to methods, systems, and computer program products for managing a distributed system. In one embodiment, a computer-implemented method is disclosed. In the method, packets that are to be transmitted among a group of nodes in a distributed system may be collected into a queue of packets, here a packet in the queue is associated with a source node and a destination node in the group of nodes. A snapshot in the group of snapshots may be obtained from a node in the group of nodes, therefore a group of snapshots may be obtained from the group of nodes. A snapshot of the distributed system may be generated based on the queue of packets and the group of snapshots. In other embodiments, a computer-implemented system and a computer program product for managing a distributed system are disclosed.

19 Claims, 10 Drawing Sheets

(51) Int. Cl.
    *H04L 29/08*     (2006.01)
    *G06F 16/182*     (2019.01)

(56) References Cited

U.S. PATENT DOCUMENTS

| | | | |
|---|---|---|---|
| 9,485,200 B2* | 11/2016 | Munoz | H04L 49/9078 |
| 9,804,798 B2 | 10/2017 | Beveridge | |
| 9,870,271 B1 | 1/2018 | Lappas | |
| 2004/0258088 A1* | 12/2004 | Clark | H04L 47/2441 |
| | | | 370/465 |
| 2005/0138470 A1* | 6/2005 | Cromer | G06F 11/2294 |
| | | | 714/22 |
| 2009/0083390 A1* | 3/2009 | Abu-Ghazaleh | H04L 43/10 |
| | | | 709/209 |
| 2017/0046234 A1* | 2/2017 | Yang | G06F 16/2365 |
| 2017/0139782 A1* | 5/2017 | Chen | G06F 16/27 |
| 2018/0288145 A1* | 10/2018 | Levy | H04L 43/022 |

OTHER PUBLICATIONS

Cui, et al., "HotSnap: A Hot Distributed Snapshot System for Virtual Machine Cluster", LISA'13 Proceedings of the 27th USENIX conference on Large Installation System Administration, Washington, DC—Nov. 3-8, 2013, pp. 59-73.

Mell et al., "The NIST Definition of Cloud Computing", National Institute of Standards and Technology, Special Publication 800-145, Sep. 2011, 7 pages.

\* cited by examiner

DISTRIBUTED SYSTEM MANAGEMENT USING SNAPSHOTS AND PACKETS

BACKGROUND

With developments of distributed systems, multiple nodes (such as physical machines or virtual machines) may be deployed in a distributed system. Nodes in the distributed system may communicate with each other and each of these nodes may have its individual state. Sometimes, it is desired to take a snapshot of the distributed system, and thus all states of the nodes included in the distributed system should be saved. Therefore, taking a snapshot of the distributed system is faced with more difficulties.

SUMMARY

In one aspect, a computer-implemented method is disclosed. According to the method, packets that are to be transmitted among a group of nodes in a distributed system may be collected into a queue of packets, here a packet in the queue is associated with a source node and a destination node in the group of nodes. A snapshot in the group of snapshots may be obtained from a node in the group of nodes, therefore a group of snapshots may be obtained from the group of nodes. A snapshot of the distributed system may be generated based on the queue of packets and the group of snapshots.

In another aspect, a computer-implemented system is disclosed. The computing system comprises a computer processor coupled to a computer-readable memory unit, where the memory unit comprises instructions that when executed by the computer processor implements a method. According to the method, packets that are to be transmitted among a group of nodes in a distributed system may be collected into a queue of packets, here a packet in the queue is associated with a source node and a destination node in the group of nodes. A snapshot in the group of snapshots may be obtained from a node in the group of nodes, therefore a group of snapshots may be obtained from the group of nodes. A snapshot of the distributed system may be generated based on the queue of packets and the group of snapshots.

In another aspect, a computer program product is disclosed. The computer program product comprises a computer readable storage medium having program instructions embodied therewith. The program instructions are executable by an electronic device to cause the electronic device to perform actions of: collecting packets that are to be transmitted among a group of nodes in a distributed system into a queue of packets, a packet in the queue being associated with a source node and a destination node in the group of nodes; obtaining a group of snapshots from the group of nodes, a snapshot in the group of snapshots being obtained from a node in the group of nodes; and generating a snapshot of the distributed system based on the queue of packets and the group of snapshots.

It is to be understood that the summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Through the more detailed description of some embodiments of the present disclosure in the accompanying drawings, the above and other objects, features and advantages of the present disclosure will become more apparent.

DETAILED DESCRIPTION

Figure 1:
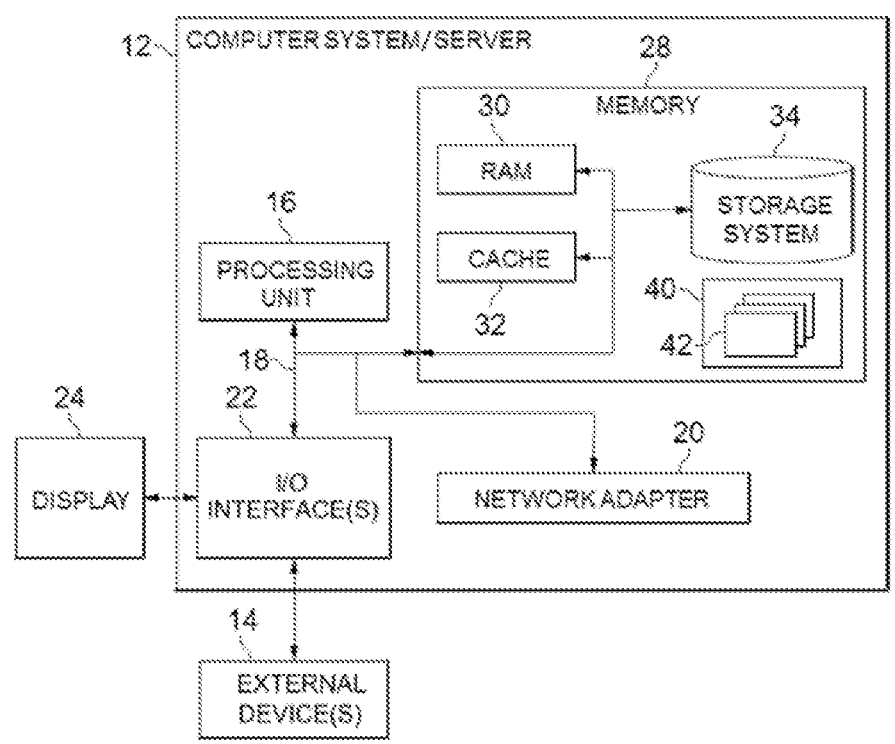
FIG. 1 depicts a cloud computing node according to an embodiment of the present disclosure.

Some embodiments will be described in more detail with reference to the accompanying drawings, in which the embodiments of the present disclosure have been illustrated. However, the aspects of the present disclosure can be implemented in various manners, and thus should not be construed to be limited to the embodiments disclosed herein.

It is understood in advance that although this embodiment includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node is only one example of a suitable cloud computing node and is not intended to suggest any limitation as to the scope of use or functionality of embodiments of the invention described herein. Regardless, cloud computing node is capable of being implemented and/or performing any of the functionality set forth hereinabove.

In cloud computing node there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node is shown in the form of a general-purpose computing device. The components of computer system/server 12 may include, but are not limited to, one or more processors or processing units 16 (although only one is depicted in FIG. 1), a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
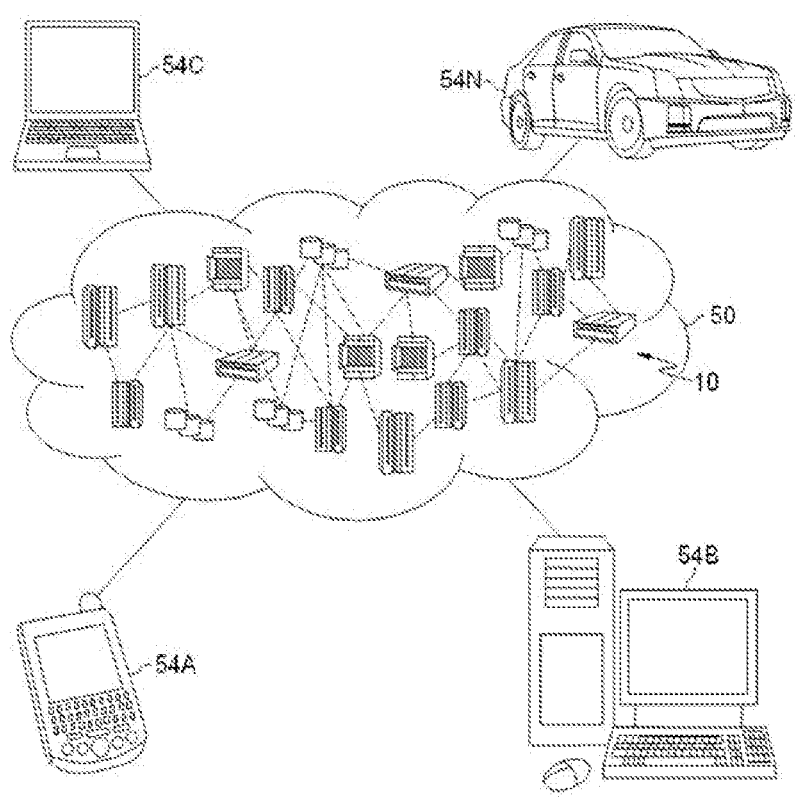
FIG. 2 depicts a cloud computing environment according to an embodiment of the present disclosure.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
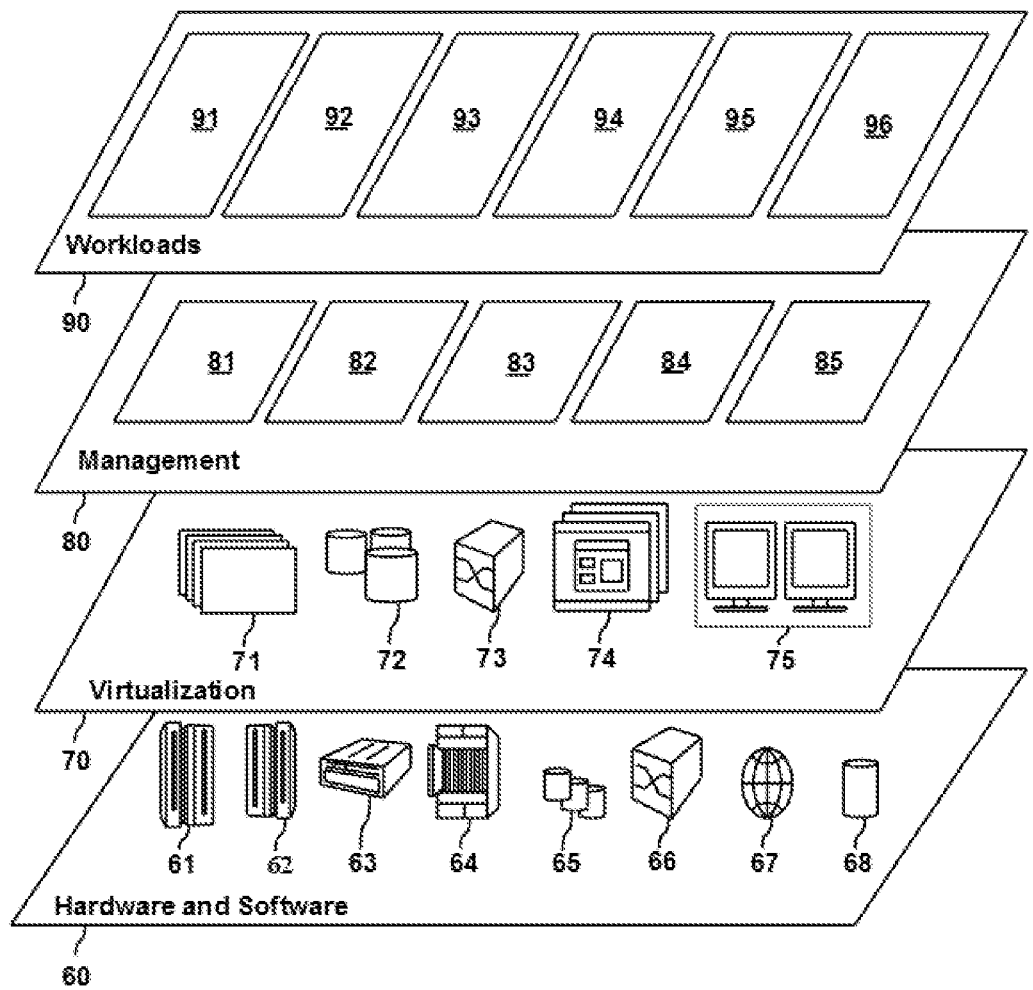
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and management processing 96. Hereinafter, reference will be made to FIG. 4 to FIG. 10 to describe details of the management processing 96.

In a distributed system such as a Virtual Machine (VM) system, there may be deployed multiple VM nodes. In order to generate a snapshot of the distributed system, an individual snapshot should be generated for each of the nodes. However, the states of the nodes may change as time goes by and sometimes there may be a conflict among the states of the nodes. Although there have provided solutions for generating a snapshot for a single node, these solutions cannot solve the problem of the above conflict and reference will be made to FIG. 4 to explain details of the conflict.

Figure 4:
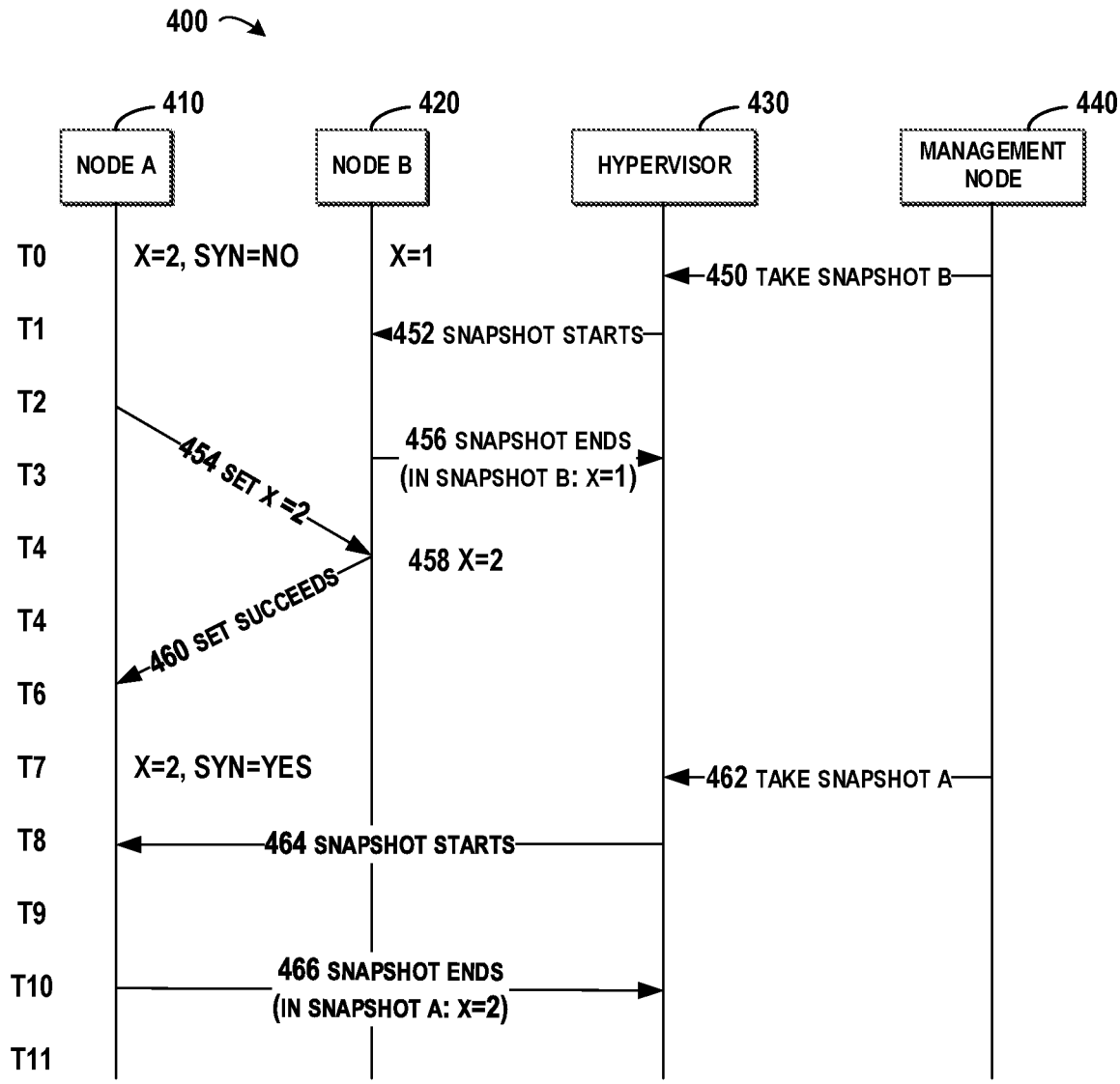
FIG. 4 depicts an example diagram for taking a snapshot of a distributed system according to one conventional solution.

FIG. 4 depicts an example diagram for taking a snapshot of a distributed system 400 according to one conventional solution. Here the distributed system 400 may comprise multiple components: a management node 440 for managing the distributed system 400; one or more nodes (node A 410 and node B 420, such as VM modes) in the distributed system 400; and a hypervisor 430 for acting as an agency between the multiple nodes and the management node 440.

Reference numbers T0-T11 indicate various time points related to taking a snapshot of the distributed system 400. Although FIG. 4 illustrates only two nodes 410 and 420, in another example there may be more than two nodes. Further, although the present disclosure describes details of embodiments by taking a VM distributed system as an example, the nodes in the distributed system 400 may be physical devices in other embodiments.

At time point T0, in the node B 420, a variable X=1. In the node A 410, a variable X=2 and the "SYN" flag is set to "NO" for indicating the value of the variable X in the node A 410 is not synchronized to the node B 420. Initially, the management node 440 may notify the hypervisor 430 to take a snapshot for the node B 420 at an arrow 450. At an arrow 452, the hypervisor 430 may instruct the node B 420 to take the snapshot, and then at an arrow 456 the node B 420 may take a snapshot B where X=1 at this time point. In the distributed system, as the node A 410 may operate independently from the node B 420, the node A 410 may send to the node B 420 a request for setting X=2 at an arrow 454. The node B 420 may set X=2 at 458 and send a response to inform the node A 410 that the setting succeeded at an arrow 460. In node A 410 at the time point T7, X=2 and SYN=Yes. Also at the time point T7, as illustrated by an arrow 462, the management node 440 may notify the hypervisor 430 to take a snapshot A. In turn, at time point T8 the hypervisor 430 may notify the node A 410 to take a snapshot at an arrow 464. Then, the node A 410 may notify the hypervisor 430 at an arrow 466 that the snapshot A is obtained (here, in the snapshot A, X=2). With the above procedure, the values "X" in the snapshots A and B are different, which results in a conflict. Therefore, how to obtain a snapshot in a distributed system becomes a difficult problem.

Figure 5:
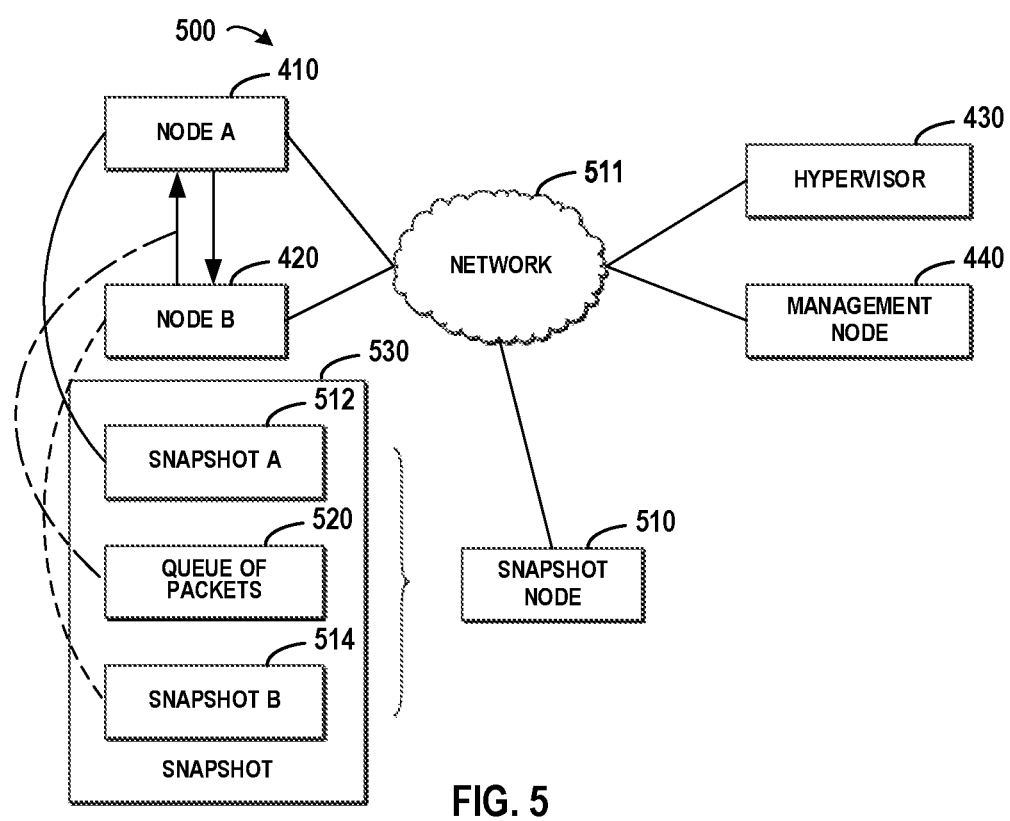
FIG. 5 depicts an example diagram for taking a snapshot of a distributed system according to an embodiment of the present disclosure.

In order to at least partially solve the above and other potential problems, a new method for obtaining a snapshot of a distributed system is disclosed according to embodiments of the present disclosure. Therefore, FIG. 5 depicts an example diagram 500 for taking a snapshot of a distributed system according to an embodiment of the present disclosure. In general, according to embodiments of the present disclosure, network packets that are to be transmitted among a group of nodes in a distributed system may be collected into a queue of packets. In such a system, a packet in the queue is sent from a source node to a destination node in the group of nodes. A snapshot may be obtained from a node in the group of nodes, therefore a group of snapshots may be obtained from the group of nodes. Based on the queue of packets and the group of snapshots, a snapshot of the distributed system may be generated. With these embodiments, even if the multiple nodes in the distributed system exchange packets with each other and states of respective nodes may be changed by the packets, the state of the whole distributed system may be correctly recoded based on the groups of snapshots and the collected packets.

As shown in FIG. 5, the node A 410, the node B 420, the hypervisor 430, and management 440 may be connected via a network 511. In this embodiment, a snapshot node 510 may be added for facilitating in obtaining the snapshot of the distributed system. Here, the distributed system may operate in a normal state or a "snapshot" state. Once the distributed system enters into the "snapshot" state from a normal state, all the network traffic among the nodes should be collected into a queue 520 of packets. For example, all the network packets may be transmitted to the snapshot node 510 through network 511 and collected there. In the "snapshot" state, a snapshot A 512 and a snapshot B 514 may be obtained from the node A 410 and the node B 420, respectively. Further, a snapshot 530 may be obtained based on the snapshot A 512, the snapshot B 514, and the queue 520 of packets.

Figure 6:
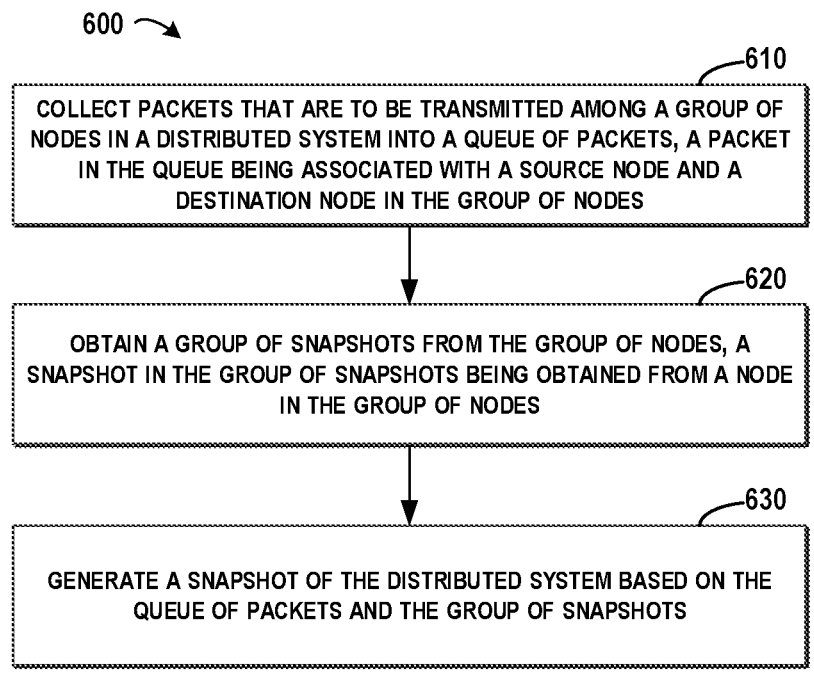
FIG. 6 depicts an example flowchart of a method for taking a snapshot of a distributed system according to an embodiment of the present disclosure.

FIG. 6 depicts an example flowchart of a method 600 for taking the snapshot 530 of the distributed system 500 (shown in FIG. 5) according to an embodiment of the present disclosure. At a block 610, packets that are to be transmitted among a group of nodes in a distributed system may be collected into a queue of packets, here a packet in the queue is associated with a source node and a destination node in the group of nodes. In this embodiment, information about the group of nodes in the distributed system may be recorded, for example, by a data structure as illustrated in Table 1.

TABLE 1

| Node Information | | |
|---|---|---|
| No. | Name | Description |
| 1 | Node UID | Unique identification of the node |
| 2 | Timestamp | System time when the state of the node is queried |
| 3 | Node Address | IP address and/or hostname of the node |

In Table 1, the first column indicates a number of each of the entries in the table, the second column indicates names of the information of the node, and the third column indicates descriptions of the information. Taking the first entry as an example, the unique identification of the node may be recorded. Although the above Table 1 illustrates three aspects about each of the nodes, in other embodiments, more or less aspects may be recorded for obtaining the snapshot 530. The information about nodes in the distributed system may be collected by traversing each of the nodes, and the information may be collected in advance or at an initial stage of obtaining the snapshot 530.

Further, when the snapshot 530 is to be obtained for the distributed system, information about the snapshot 530 may be recorded. In one example, the information may be recorded in a data structure as illustrated in Table 2 as below.

TABLE 2

| Snapshot Information | | |
|---|---|---|
| No. | Name | Description |
| 1 | Snapshot UID | Unique ID of the snapshot |
| 2 | Timestamp | System time when the snapshot is taken |
| 3 | Node Address | IP address and/or hostname of the node |
| 4 | Node UID | Unique ID of the node |
| 5 | Snapshot Image | A name and a path for an image on which the snapshot is based |

Here, the structure of Table 2 is similar to that of Table 1. Taking the first entry as an example, the unique identification of the snapshot may be recorded. Here, the entries in Table 2 are related to one node in the distributed system. If the distributed system comprises N nodes, then Table 2 may comprise N groups of entries related to the N nodes. Although the above Table 2 illustrates five aspects about the snapshot, in other embodiments, more or less aspects may be recorded for obtaining the snapshot 530. The information about nodes in the distributed system may be collected under control of the snapshot node 510.

In this embodiment, information about each of the packets may be recorded, for example, in a data structure as illustrated in Table 3 as below.

TABLE 3

Packet Information

| No. | Name | Description |
| --- | --- | --- |
| 1 | Packet UID | Unique ID of the snapshot |
| 2 | Source Address/Port | A source address/port from which the packet is transmitted |
| 3 | Destination Address/Port | A destination address/port to which the packet is transmitted |
| 4 | Sequence Number | An identification flag for reconstructing the packet from several fragments |
| 5 | Protocol | A network protocol with which the packet complies |
| 6 | Length | A length of the packet in bytes |
| 7 | Checksum | A checksum for the packet |
| 8 | Data | Data included in the packet |
| 9 | Timestamp | System time when the snapshot is captured |
| 10 | Snapshot UID | Unique ID of a snapshot associated with the packet |
| 11 | Snapshot Name | A name of the snapshot |

Here, the structure of Table 3 is similar to that of Table 1. Taking the first entry as an example, the unique identification of the packet may be recorded. Although the above Table 3 illustrates eleven aspects about one packet, in another embodiment, more or less aspects may be recorded for obtaining the snapshot 530. The information about packets in the distributed system may be collected once the state is set to "snapshot." At this point, all the packets that are to be transmitted among the group of nodes may be transmitted to the snapshot node 510 and collected into the queue 520 of packets there.

According to embodiments of the present disclosure, in order to obtain the queue 520 of packets, the packets that are to be transmitted among the group of nodes may be obtained according to a chronological order. Then the obtained packets may be added into the queue 520 according to a chronological order of timestamps of the obtained packets. With these embodiments, all the packets that are to be transmitted among the group of nodes may be arranged in the queue 520 according to a chronological order. On one hand, the queue 520 may be used to generating the snapshot 530 of the distributed system 500 together with the group of snapshots. On the other hand, packets in the queue 520 may be forwarded to corresponding nodes in the distributed system 500 for continuing the suspended communication among the group of nodes.

At a block 620, a snapshot in the group of snapshots may be obtained from a node in the group of nodes, therefore a group of snapshots may be obtained from the group of nodes. In the distributed system 500, all the nodes may operate independently, and thus the procedure for obtaining a snapshot for a given node may be independently from another node. According to embodiments of the present invention, with respect to a given node in the group of nodes, a notification may be sent for notifying the given node to obtain a given snapshot of the given node. Here, as the hypervisor 430 (shown in FIG. 5) of the distributed system 500 controls operations of the nodes, the hypervisor 430 may be notified first and then the hypervisor 430 may send instructions to the given node for obtaining the given snapshot. With these embodiments, each of the nodes in the distributed system 500 may be notified by the hypervisor 430 to obtain a corresponding snapshot.

At a block 630, a snapshot of the distributed system 500 may be generated based on the queue 520 of packets and the group of snapshots. Here, once the group of snapshots are obtained, the obtained group of snapshots together with the queue 520 of packets may be utilized for generating the snapshot 530. In embodiments of the present disclosure, the group of snapshots may be stored associated with the queue 520 to form the snapshot 530 for the distributed system 500.

Figure 7:
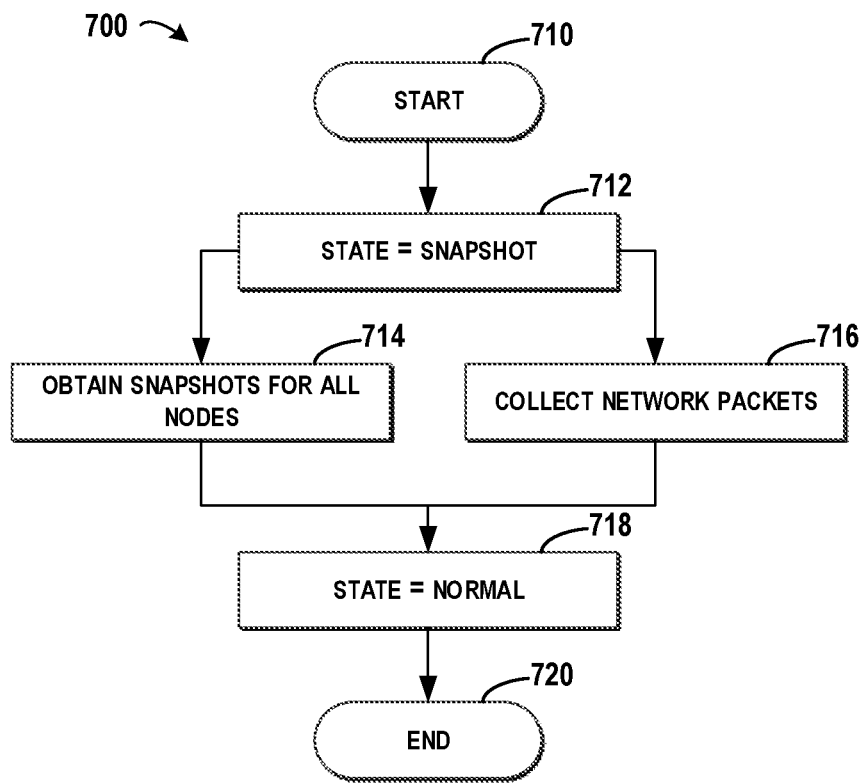
FIG. 7 depicts an example flowchart for taking a snapshot of a distributed system according to an embodiment of the present disclosure.

FIG. 7 depicts an example flowchart for a method 700 for taking the snapshot 530 according to an embodiment of the present disclosure, and reference will be made to FIG. 7 for details hereinafter. In FIG. 7, the method 700 may start at a block 710. In this embodiment, the distributed system 500 (shown in FIG. 5) may operate in a normal state or a snapshot state. In the normal state, all the packets may be communicated among the groups of nodes, while in the snapshot state, all the packets may be redirected to the snapshot node 510 and collected into the queue 520. In other words, these packets are may be suspended in the queue 520 for further processing.

At a block 712, the distributed system may be switched to the snapshot state, and then the procedure shown in blocks 714 and 716 may be performed in parallel. At the block 716, network packets among the nodes may be collected. Specially, all network packets may be collected and stored in the queue 520 (shown in FIG. 5). During the collecting procedure, information such as source and destination and the like may be extracted from the packets and filled in the Table 3 as discussed in the above paragraphs.

At the block 714, snapshots may be obtained for all the nodes. Specifically, the hypervisor 430 (shown in FIG. 5) may send snapshot commands to respective individual nodes to obtain respective snapshots. Depending on the specific configuration of the distributed system 500, the snapshot may comprise various states about the node, such as states about the disk, the memory and configurations of the node. Further, the progress of obtaining the snapshot may be monitored, and then information such as snapshot name, UID, time stamp and the like may be inserted into Table 2.

The above procedure may be implemented independently for each of the nodes, and when all snapshots are obtained, the method 700 may proceed to a block 718, where the state may be set to normal and incoming network packets may be routed to corresponding destination nodes. Further, the method 700 may end at a block 720. Here, the collected packets may be stored in the queue 520 and then the queue 520 of packets and the snapshots may be used to generate the snapshot 530 for the distributed system. Although not illustrated in FIG. 7, information about the nodes may be obtained and filled in the Table 1. For example, this information may be obtained at the block 712 when the state is set to "snapshot."

According to embodiments of the present disclosure, the queue 520 of packets may be forwarded to destination nodes associated with the queue 520 of packets in the group of nodes. With these embodiments, the suspended packets among the nodes may continue their normal operations after the group of snapshots are obtained. Although there may be a delay in the distributed system 500 due to being switched to a snapshot state, after the group of snapshots are obtained, the packets may be forwarded in a chorological order to corresponding destination nodes as usual.

Figure 8:
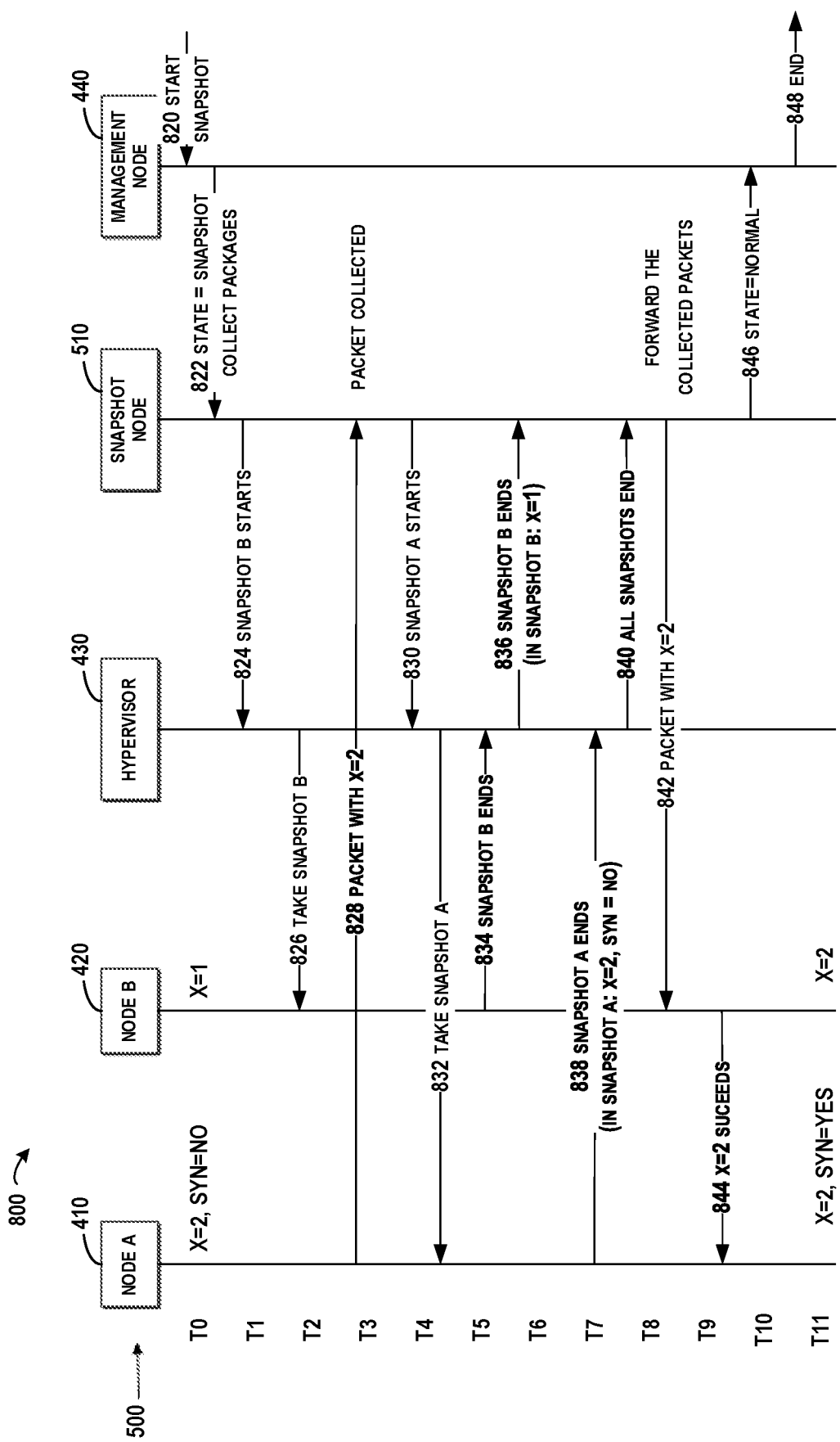
FIG. 8 depicts a schematic diagram for interactions between components in a distributed system according to an embodiment of the present disclosure.

FIG. 8 depicts a schematic diagram 800 for interactions between components in a distributed system 500 according to an embodiment of the present disclosure. As shown in FIG. 8, at an arrow 820, the management node 440 starts the procedure for obtaining the snapshot 530 (shown in FIG. 5). At an arrow 822, the state of the distributed system may be set to "snapshot" and the snapshot node 510 may be notified to collect all the network packets among the node A 410 and the node B 420. From this moment, all the network packets may be routed to the snapshot node 510 instead of the original destination node(s). At an arrow 824, the hypervisor 430 may be notified to take the snapshot B. Then at an arrow 826, the node B 420 may take the snapshot B.

At the initial stage, the variable X=2 and SYN=NO at the node A 410. Further, the node A 410 may modify the variable X and set X=2 at the node B 420. At an arrow 828, the node A 410 may send a request for setting X=2 at the node B 420. Here, a packet of the request may be routed to the snapshot node 510 and collected into the queue 520 (shown in FIG. 5). At an arrow 830, the hypervisor 430 may be notified to take the snapshot A, and then the hypervisor 430 may notify the node A 410 at an arrow 832. At an arrow 834, the node B 420 may complete the snapshot, and then at an arrow 836 the hypervisor 430 may notify the snapshot node 510 that the snapshot B is successfully obtained (here, in the snapshot B, X=1). After some time, at an arrow 838, the snapshot A is obtained (where X=2, and SYS=NO), and then at an arrow 840, the snapshot node 510 is notified that all the snapshots A and B are successfully obtained. At this point, the collected queue 520 of packets and the snapshots A and B may be stored in an associated manner as the snapshot 530 for the distributed system.

Further, as the network traffic are blocked among the node A 410 and the node B 420 and redirected to the snapshot node 510, the blocked traffic should be forwarded to corresponding destination nodes to ensure a correct operation of the distribute system. Specifically, at an arrow 842, the packet with "X=2" may be forwarded to the destination node B 420 for updating the variable X from 1 to 2. Once the variable X is set to 2 at the node B 420, the node A 410 may be notified of the successful updates at an arrow 844. At this point, the variables X at both of nodes A and B have the same value of 2. Further, the state of the distributed system may return to normal at an arrow 846, and the whole procedure may come to an end at an arrow 848.

According to embodiments of the present disclosure, all the network packets should be continuously routed to the snapshot node 510 when the state is "snapshot," even if snapshot(s) for a portion of the nodes have successfully obtained. The routing of the network packets should get back to normal when the state is set to normal.

The above paragraphs have described how to obtain the snapshot 530 of the distributed system 500. Hereinafter, details about how to revert the distributed system 500 based on the snapshot 530 will be provided. According to embodiments of the present disclosure, the group of nodes may be reverted based on the group of snapshots in response to receiving a request for reverting the distributed system 500. The queue 520 of packets may be directed to destination nodes associated with the queue 520 of packets in the group of nodes. With these embodiments, the group of snapshots may ensure that the nodes may be recovered to the state when the respective snapshots are obtained. Further, the packets may help the nodes to proceed to a state as if the packets are transmitted among the nodes during a normal state.

According to embodiments of the present disclosure, the reverting time may vary for various nodes, and thus the time cost for reverting various nodes may be determined so as to ensure that the multiple nodes may be recovered substantially at a same time point. In these embodiments, with respect to a first node and a second node in the group of nodes (e.g., node A 410 and node B 420), a first time cost and a second time cost for reverting the first node and the second node may be determined, respectively. Based on a comparison of the first time cost and the second time cost, a node may be selected from the first node and the second node. Further, a snapshot associated with the selected node may be loaded into the selected node. For example, if it is determined that the time for reverting the node A 410 is longer than that for reverting the node B 420, then the snapshot A may be first loaded into the node A 410. After some time, the snapshot B may be loaded in the node B 420, such that both of the nodes A and B may start up at a similar time point.

According to embodiments of the present disclosure, with respect to a given packet in the queue 520 of packets, the given packet may be directed to a destination node associated with the given packet to cause the destination node to implement an instruction that is specified by the given packet. With these embodiments, the destination node may continue to implement the instruction in the suspended packet, such that the destination node may go into an actual state as if the packets are not suspended. By this way, an inconsistency among the multiple nodes may be prevented.

Here, once the given packet is directed to the destination node, the destination node may implement the instruction specified by the given packet. Continuing the above example, when the packet with "X=2" is directed to the node B 420, the variable X at the node B 420 may be updated to "2." Then the node B 420 may notify the node A 410 of a successful update.

According to embodiments of the present disclosure, when instructions that are specified by all packets in the queue 520 of packets having been implemented, a notification may be provided to indicate that the distributed system 500 has been reverted. With these embodiments, the all the nodes in the distributed system 500 may be reverted to the states at the time point when the snapshot 530 is generated.

Sometimes, the distributed system 500 may comprise a large number of nodes. At this point, if only one snapshot node 510 is deployed for collecting the network packets, the performance may decrease with the increase in the workload of the snapshot node 510. According to embodiments of the present disclosure, when the size of the group of nodes reaches a certain level, the group of nodes may be divided into a first group and a second group of nodes. With these embodiments, the two groups may be controlled by two respective snapshot nodes 510 so as to accelerate the procedures for obtaining the snapshot 530 of the distributed system 500 and for reverting the distributed system 500 from the obtained snapshot 530.

There may be multiple ways to divide the group, for example, the groups may be randomly divided according to a maximum size; alternatively, the groups may be divided according to network domains in the distributed system 500. If multiple snapshot nodes 510 are deployed in the distributed system 500, the reverting procedure will be slightly different from the above describe where only one snapshot node 510 exists.

In one example, the group of nodes are divided into a first and a second group, and a first and a second snapshot nodes are obtained (not shown). During the reverting procedure, after respective snapshots are loaded into the respective nodes, the first and second queues of packets may be routed to corresponding destination nodes. For a first domain controlled by a first snapshot node, if a destination node associated with a packet is not in the first domain, then the packet may be routed to the second snapshot node, and thus the second snapshot node may route the packet to the destination node. Although the above paragraphs describe how to divide the multiple nodes in the distributed system into two groups, in other embodiments, the multiple nodes may be divided into two or more groups.

The above paragraphs have described how to revert the distributed system in an ideal situation where there is no communication among the nodes in the distributed system. Usually, as long as the distributed system works, communication will never stop during the reverting procedure. According to embodiments of the present disclosure, during reverting the group of nodes and directing the queue of packets, the snapshot node 510 may collect packets that are to be transmitted among the group of nodes in the distributed system. Here, the incoming packets may be captured into a temporary queue for further processing. Then, the captured packets may be forwarded to destination nodes associated with the temporary queue of packets in the group of nodes after directing the queue of packets. With these embodiments, although there might be a delay, the operations of the distributed system may not be interrupted by the reverting procedure.

Figure 9:
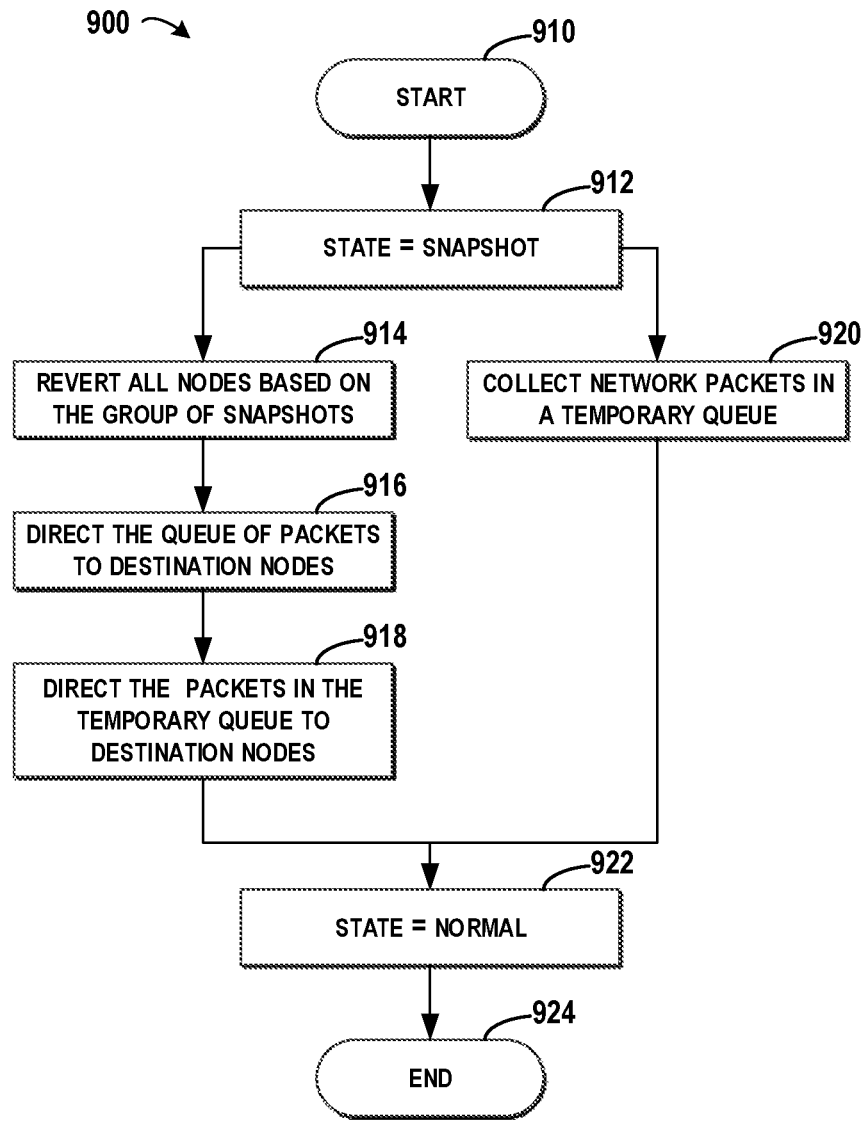
FIG. 9 depicts an example flowchart for reverting a distributed system based on a snapshot according to an embodiment of the present disclosure.

Hereinafter, reference will be made to FIG. 9 for details about how to revert the distributed system 500. FIG. 9 depicts an example flowchart for a method 900 for reverting the distributed system 500 based on the snapshot 530 according to an embodiment of the present disclosure. In FIG. 9, the method 900 may start at a block 910, and the state of the distributed system may be set to "snapshot" at a block 912. Afterwards, the left and right branches in FIG. 9 may be implemented in parallel. In a block 920 in the right branch, the network packets that are to be transmitted among the nodes in the distributed system may be collected into a temporary queue.

In the left branch, all the nodes may be reverted based on the group of nodes at a block 914. For example, the node A 410 may be reverted from the snapshot A (shown in FIG. 8) and the node B 420 may be reverted from the snapshot B (shown in FIG. 8). Further, the queue 520 of packets that are collected according to FIG. 7 may be directed to corresponding destination nodes at a block 916. Here, the operations for each of the nodes may be performed independently. It is to be understood that the temporary queue may comprise one or more packets that are to be transmitted among the nodes. Accordingly, at a block 918, the packets that are suspended in the temporary queue should be routed to the corresponding destination nodes.

Figure 10:
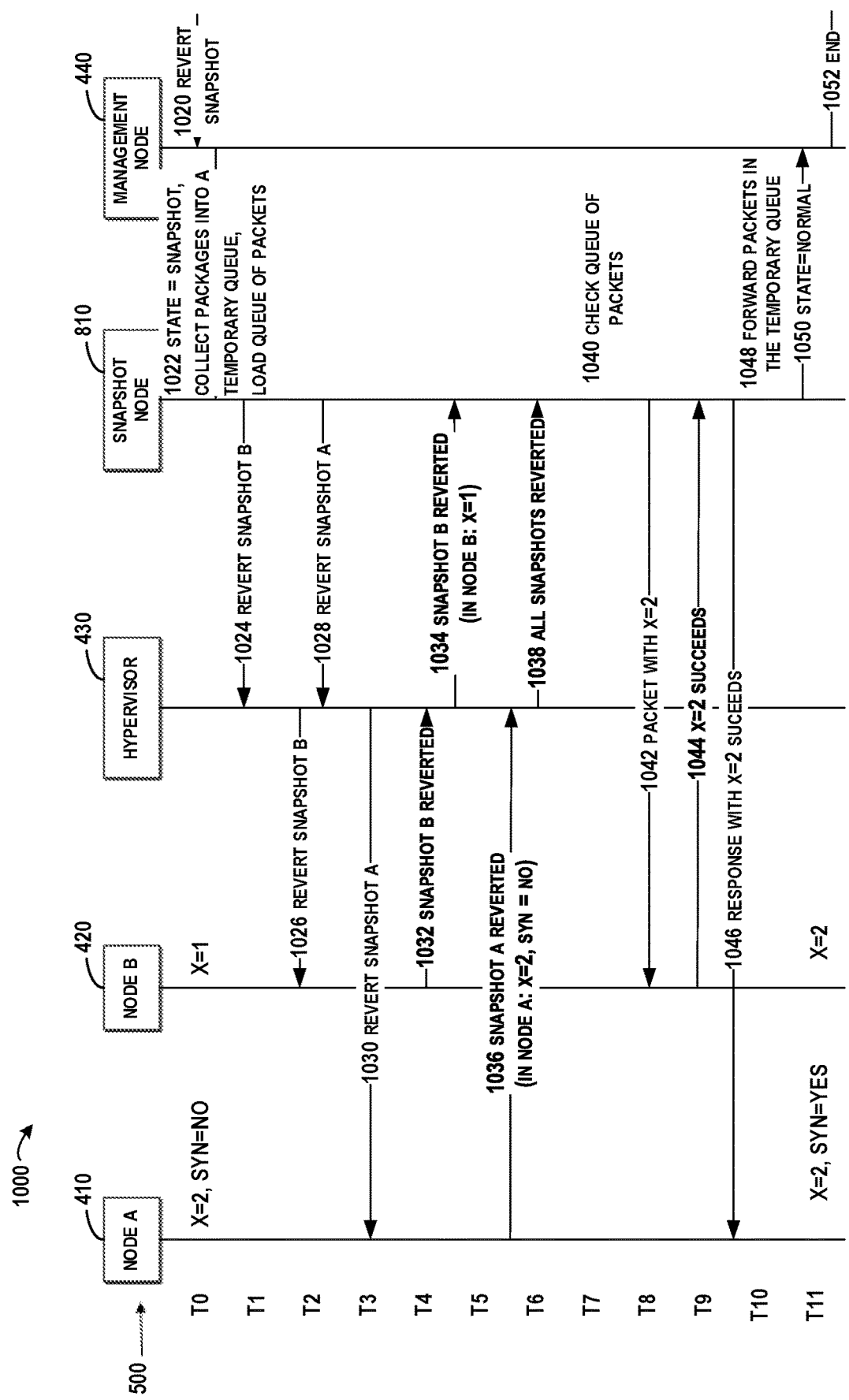
FIG. 10 depicts a schematic diagram for reverting a distributed system based on a snapshot according to an embodiment of the present disclosure.

FIG. 10 depicts a schematic diagram 1000 for reverting the distributed system based on the snapshot 530 according to an embodiment of the present disclosure. At an arrow 1020, the management node 440 may start the procedure for reverting the distributed system 500. At an arrow 1022, the state may be set to "snapshot," the network packets may be collected into the temporary queue, and the packets in the queue 520 may be loaded for sending to destination nodes. At an arrow 1024, the hypervisor 430 may be notified to revert the snapshot B; at an arrow 1026, the node B 420 may be notified to revert the snapshot B; at an arrow 1028, the hypervisor 430 may be notified to revert the snapshot A; and at an arrow 1030, the node A 410 may be notified to revert the snapshot A.

When the node B 420 is reverted from the snapshot B, at an arrow 1032, the node B 420 may notify the hypervisor 430 that the node B 420 is successfully reverted. Further, the hypervisor 430 may notify the snapshot node 810 of the success, where X=1 in the node B 420. When the node A 410 is reverted from the snapshot A, at an arrow 1036, the node A 410 may notify the hypervisor 430 that the node A 410 is successfully reverted, where X=2 in the node A 410. At an arrow 1038, the snapshot node 810 may be notified that all the nodes A and B are successfully reverted. At 1040, the loaded queue 520 of packets may be checked, and then the packet for setting "X=2" may be sent to the destination node B 420 at an arrow 1042. When the node B 420 has set X to 2, it may notify the snapshot node 810 that the variable X at the node B 420 is successfully updated to "2." Then at an arrow 1046, a response may be sent to the node A 410.

Further, all the packets in the temporary queue may be forwarded to corresponding destination nodes. For example, if a packet targeting at the node B 420 is collected into the temporary queue, then the collected packet may be forwarded to the node B 420. After all the queues in the temporary queue are processed, the state of the distributed system may be set to "normal" at an arrow 1050. Then, the reverting procedure ends at an arrow 1052. With the above procedure, the states of nodes A and B are reverted and the variables X at both of the nodes A and B are set to "2." In this embodiment, the states in both nodes are consistent with each other.

According to embodiments of the present disclosure, in order to delete the snapshot 530, the queue 520 of packets and the group of snapshots should be deleted together. Specifically, Tables 1 to 3 may be queried to determine locations of snapshots for all the nodes and the queue 520 of packets.

According to embodiments of the present disclosure, with respect to a given node in the group of nodes, a heart beating signal may be collected from the given node for detecting whether the given node is still active. As a default timeout value for the heart beating is much longer than the time for taking a snapshot, the above procedures for generating the snapshot 530 and for reverting the distributed system 500 based on the generated snapshot 530 may be successfully implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software packet, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   collecting, by a first processor, a plurality of packets that are to be transmitted among a group of nodes in a distributed system into a queue of packets, each of the plurality of packets in the queue being associated with a source node and a destination node in the group of nodes, wherein the collecting packets into the queue comprises:
     obtaining, by a fourth processor, the plurality of packets that are to be transmitted among the group of nodes; and
     adding, by a fifth processor, the obtained packets into the queue according to a chronological order of timestamps of the obtained packets;
   obtaining, by a second processor, a group of snapshots from the group of nodes, a snapshot in the group of snapshots being obtained from a node in the group of nodes;
   generating, by a third processor, a snapshot of the distributed system based on the queue of packets and the group of snapshots;
   reverting, by a sixth processor, the group of nodes based on the group of snapshots in response to receiving a request for reverting the distributed system;
   directing, by a seventh processor, each of the plurality of packets in the queue of packets to its respective destination node;

capturing, by an eighth processor, a plurality of packets that are to be transmitted among the group of nodes in the distributed system during reverting the group of nodes and directing the captured plurality of packets to the queue of packets; and forwarding, by a ninth processor, each of the captured packets to its respective destination node after directing the captured plurality of packets to the queue of packets; and wherein none, any, or all of the first, second, and third processors are a same processor; and wherein none, any, or all of the first, second, and third processors include more than one processor.

2. The computer-implemented method of claim 1, wherein:
none, any, or all of the fourth and fifth processors are the first or the same processor; and
none, any, or all of the fourth and fifth processors include more than one processor.

3. The computer-implemented method of claim 2, wherein:
none, any, or all of the sixth and seventh processors are the same processor; and
none, any, or all of the sixth and seventh processors include more than one processor.

4. The computer-implemented method of claim 3, wherein the reverting the group of nodes, with respect to a first node and a second node in the group of nodes, comprises:
determining, by a tenth processor, a first time cost and a second time cost for reverting the first node and the second node, respectively;
selecting, by an eleventh processor, a node from the first node and the second node based on a comparison of the first time cost and the second time cost; and
loading, by a twelfth processor, a snapshot associated with the selected node into the selected node;
wherein none, any, or all of the tenth, eleventh, and twelfth processors are the sixth or the same processor; and
wherein none, any, or all of the tenth, eleventh, and twelfth processors include more than one processor.

5. The computer-implemented method of claim 3, wherein the directing each of the plurality of packets in the queue of packets, with respect to a given packet in the queue of packets, comprises:
directing, by a tenth processor, the given packet to the destination node associated with the given packet to cause the destination node to implement an instruction that is specified by the given packet;
wherein the tenth processor is or is not the seventh processor or the same processor; and
wherein the tenth processor does or does not include more than one processor.

6. The computer-implemented method of claim 5, further comprising:
providing, by an eleventh processor, a notification indicating that the distributed system has been reverted in response to determining that the instruction that is specified by the given packet in the queue of packets has been implemented;
wherein the eleventh processor is or is not the same processor; and
wherein the eleventh processor does or does not include more than one processor.

7. The computer-implemented method of claim 3, wherein:

none, any, or all of the eighth and ninth processors are the same processor; and
none, any, or all of the eighth and ninth processors include more than one processor.

8. The computer-implemented method of claim 1, wherein obtaining the group of snapshots, with respect to a given node in the group of nodes, comprises:
notifying, by a tenth processor, the given node via a hypervisor of the distributed system to obtain a given snapshot of the given node;
wherein the tenth processor is or is not the second processor or the same processor; and
wherein the fourth tenth processor does or does not include more than one processor.

9. The computer-implemented method of claim 1, further comprising:
forwarding, by a tenth processor, one of packets in the plurality of packets of the queue of packets to its destination node;
wherein the tenth processor is or is not the same processor; and
wherein the tenth processor does or does not include more than one processor.

10. The computer-implemented method of claim 1, further comprising:
dividing, by a tenth processor, the group of nodes into a first group and a second group of nodes in response to a size of the group of nodes being above a predefined threshold;
wherein the tenth processor is or is not the same processor; and
wherein the tenth processor does or does not include more than one processor.

11. A computer-implemented system, comprising a computer processor coupled to a computer-readable memory unit, the memory unit comprising instructions that when executed by the computer processor implements a method comprising:
collecting packets that are to be transmitted among a group of nodes in a distributed system into a queue of packets, a packet in the queue being associated with a source node and a destination node in the group of nodes;
obtaining a group of snapshots from the group of nodes, a snapshot in the group of snapshots being obtained from a node in the group of nodes;
generating a snapshot of the distributed system based on the queue of packets and the group of snapshots;
reverting the group of nodes based on the group of snapshots in response to receiving a request for reverting the distributed system, wherein the reverting the group of nodes, with respect to a first node and a second node in the group of nodes, comprises:
determining a first time cost and a second time cost for reverting the first node and the second node, respectively; and
loading a snapshot associated with the selected node into the selected node; and
directing the packets in the queue of packets to destination nodes associated with the queue of packets in the group of nodes.

12. The computer-implemented system of claim 11, wherein the collecting packets into the queue comprises:
obtaining the packets that are to be transmitted among the group of nodes; and adding the obtained packets into the queue according to a chronological order of timestamps of the obtained packets.

13. The computer-implemented system of claim 11, wherein the reverting the group of nodes, with respect to a first node and a second node in the group of nodes, further comprises:

selecting a node from the first node and the second node based on a comparison of the first time cost and the second time cost.

14. The computer-implemented system of claim 11, wherein the directing the queue of packets, with respect to a given packet in the queue of packets, comprises:

directing the given packet to a destination node associated with the given packet to cause the destination node to implement an instruction that is specified by the given packet.

15. The computer-implemented system of claim 14, further comprising:

providing a notification indicating that the distributed system has been reverted in response to determining the instruction specified by the given packet has been implemented.

16. The computer-implemented system of claim 14, further comprising:

capturing packets that are to be transmitted among the group of nodes in the distributed system during the reverting the group of nodes and directing the captured packets to the queue of packets; and forwarding the captured packets to their respective destination nodes associated with the queue of packets in the group of nodes after directing the captured packets to the queue of packets.

17. The computer-implemented system of claim 11, wherein the obtaining the group of snapshots, with respect to a given node in the group of nodes, comprises:

notifying the given node via a hypervisor of the distributed system to obtain a given snapshot of the given node.

18. The computer-implemented system of claim 11, further comprising:

forwarding the queue of packets to destination nodes associated with the queue of packets in the group of nodes.

19. A computer program product, the computer program product comprising a computer readable storage medium having program instructions embodied therewith, the program instructions executable by an electronic device to cause the electronic device to perform actions of:

collecting packets that are to be transmitted among a group of nodes in a distributed system into a queue of packets, a packet in the queue being associated with a source node and a destination node in the group of nodes;

obtaining a group of snapshots from the group of nodes, a snapshot in the group of snapshots being obtained from a node in the group of nodes;

generating a snapshot of the distributed system based on the queue of packets and the group of snapshots;

reverting the group of nodes based on the group of snapshots in response to receiving a request for reverting the distributed system; and directing the packets in the queue of packets to destination nodes associated with the queue of packets in the group of nodes, wherein the directing the queue of packets, with respect to a given packet in the queue of packets, comprises directing the given packet to a destination node associated with the given packet to cause the destination node to implement an instruction that is specified by the given packet; and providing a notification indicating that the distributed system has been reverted in response to determining the instruction specified by the given packet has been implemented.

* * * * *